US008957634B2

(12) United States Patent
Lo et al.

(10) Patent No.: US 8,957,634 B2
(45) Date of Patent: Feb. 17, 2015

(54) NETWORK AS AUTOMATION PLATFORM FOR COLLABORATIVE E-CAR CHARGING AT THE RESIDENTIAL PREMISES

(75) Inventors: George Lo, Plainsboro, NJ (US); Mohammad Abdullah Al Faruque, Plainsboro, NJ (US); Hartmut Ludwig, West Windsor, NJ (US); Livio Dalloro, Princeton, NJ (US); Barry R. Contrael, Hollow Sugar, GA (US); Paul Terricciano, Roswell, GA (US)

(73) Assignee: Siemens Aktiengesellschaft, Munich (DE)

( * ) Notice: Subject to any disclaimer, the term of this patent is extended or adjusted under 35 U.S.C. 154(b) by 510 days.

(21) Appl. No.: 13/228,515

(22) Filed: Sep. 9, 2011

(65) Prior Publication Data

US 2012/0235646 A1 Sep. 20, 2012

Related U.S. Application Data

(60) Provisional application No. 61/452,827, filed on Mar. 15, 2011.

(51) Int. Cl.
*H02J 3/14* (2006.01)
*B60L 11/18* (2006.01)
*H02J 7/00* (2006.01)

(52) U.S. Cl.
CPC .......... *B60L 11/1844* (2013.01); *H02J 7/0013* (2013.01); *H02J 7/0027* (2013.01); *H02J 3/14* (2013.01); *Y02T 10/7088* (2013.01); *Y02T 10/7005* (2013.01); *Y02T 90/163* (2013.01); *Y02T 90/168* (2013.01); *Y02T 90/169* (2013.01); *Y02T 90/14* (2013.01); *Y02T 90/128* (2013.01); *Y02T 10/7055* (2013.01);

(Continued)

(58) Field of Classification Search
CPC ................ H02J 13/0086; H02J 3/14
USPC ......................... 320/104, 139, 137
See application file for complete search history.

(56) References Cited

U.S. PATENT DOCUMENTS

| 7,218,998 B1 * | 5/2007 | Neale ........................... 700/295 |
| 7,598,844 B2 * | 10/2009 | Corcoran et al. .......... 340/12.32 |
| 7,693,609 B2 | 4/2010 | Kressner et al. |

(Continued)

OTHER PUBLICATIONS

Financial Times, "Electric and hybrid: Sales feed off hype and subsidy", Oct. 2010.

(Continued)

*Primary Examiner* — Samuel Berhanu
*Assistant Examiner* — Jerry D Robbins

(57) ABSTRACT

A system and method are provided for the collaborative charging of electric vehicles. The collaborative charging manages the disbursement of power from a neighborhood transformer so as to increase the efficiency of electric vehicle charging at the residences without significantly altering the existing power distribution and residential infrastructures. Time-flexible loads are shed in order to efficiently allocate energy distribution without compromising the comfort or security of the user. The identities of individual residential power demands can be concealed to protect the user's privacy or made available to further optimize power allocation. The power allocation negotiation may be performed in a residential local demand management client separate from the residential charging station.

12 Claims, 9 Drawing Sheets

(52) U.S. Cl.
CPC ............... *Y04S 10/126* (2013.01); *Y04S 30/12* (2013.01); *Y04S 30/14* (2013.01); *Y02E 60/721* (2013.01)
USPC ...... 320/109; 340/870.02; 700/286; 700/291; 700/295

(56) References Cited

U.S. PATENT DOCUMENTS

| | | | |
|---|---|---|---|
| 7,792,613 B2 | 9/2010 | Kressner et al. | |
| 2006/0178918 A1* | 8/2006 | Mikurak | 705/7 |
| 2009/0062967 A1 | 3/2009 | Kressner et al. | |
| 2009/0187499 A1* | 7/2009 | Mulder et al. | 705/30 |
| 2010/0017043 A1 | 1/2010 | Kressner et al. | |
| 2010/0114387 A1* | 5/2010 | Chassin | 700/286 |
| 2010/0141046 A1* | 6/2010 | Paik | 307/126 |
| 2010/0217485 A1* | 8/2010 | Ichishi | 701/36 |
| 2010/0256830 A1* | 10/2010 | Kressner et al. | 700/291 |

OTHER PUBLICATIONS

United States Department of Energy, Office of Energy Efficiency and Renewable Energy, "Performance Statistics General Motors EV1 w/NiMH", Apr. 2009.

Simpson, "Where the Rubber Meets the Road", Tesla Motors Vehicle Systems Engineer, Feb. 2008.

California Air Resources Board, "Public hearing to consider proposed amendments to the California zero emission vehicle regulations regarding treatment of majority owned small or intermediate volume manufacturers and infrastructure standardization", Jun. 2001.

Siemens Energy, http://www.energy.siemens/com/us/en/power-distribution/e-car.htm, Published 2010.

EIA: US Energy Information Administration, http://www.eia.doe.gov/ask/electricity_faqs.asp#electricity_use_home, Aug. 2011.

* cited by examiner

NETWORK AS AUTOMATION PLATFORM FOR COLLABORATIVE E-CAR CHARGING AT THE RESIDENTIAL PREMISES

CROSS REFERENCE TO RELATED APPLICATIONS

This application claims the benefit of U.S. Provisional Application Ser. No. 61/452,827 entitled "Network as Automation Platform for Collaborative E-Car Charging at the Residential Premises," filed on Mar. 15, 2011, the contents of which are hereby incorporated by reference herein in their entirety.

FIELD OF THE INVENTION

This invention relates generally to electric vehicle charging and more particularly to methods and systems for collaborative charging of e-cars at a neighborhood-level step-down transformer connected to an electric power system.

BACKGROUND OF THE INVENTION

Electric vehicles, also known as e-cars, EVs, or plug-in electric vehicles (PEVs), are becoming increasingly popular as non-renewable fuel resources diminish. However, the increasing popularity of electric vehicles will result in a strain on the existing power distribution infrastructure as a growing number of vehicles require charging.

Typical electric cars may require 10 to 18 kWh of charge per 100 km, (e.g. the GM EV1 uses nearly 11 kWh and the Tesla Roadster uses nearly 17.4 kW·h). Charging requirements will vary by electric vehicle, battery technology, battery size, and battery charge status (half full, 30% full, etc.). Charging stations, including charging stations installed at residential premises, must be capable of efficiently providing the required amount of electricity. The maximum amount of power that can be provided to an electric vehicle is regulated by standards. According to the current Society of Automotive Engineers standard, the maximum current that may be supplied to the vehicle's on-board charger with a branch circuit breaker rated at 40 A is 32 A (continuous) for international standard Level-2 AC energy (208-240 V, single phase). Therefore, maximum continuous input power is specified as 7.68 kW (240 V×32 A). However, the present invention is not limited by the standard for maximum current set forth by the Society of Automotive Engineers.

Referring to FIG. 1, a typical end-point electrical distribution system 100 delivers power to a residential charging station 140 from the neighborhood distribution pole 103. This pole 103 has a neighborhood step-down transformer 104 that steps down the utility medium voltage to dual 120 VAC single phase (also called 240 VAC split phase). This voltage is fed through a meter 115 into the residential load control center 116. The load control center 116 consists of branch circuit breakers and distributes the power supply within various areas of the residence 120. The load control center may further consist of a load control communication center 117. Alternatively, the load control communication center 117 may operate as a separate device electrically connected to the load control center 116. One of the branch circuits feeds the charging station 140 for the residence 120. One or more electric vehicle charger cables 147 are fixed to, mounted onto, or plugged into the sockets on the charging station 140, and the other end of the charger cable 147 is connected to the vehicle 150 during charging.

Accordingly, there is a need for a system and method that can manage the disbursement of power from a neighborhood transformer so as to increase the efficiency of electric vehicle charging at the residences without significantly altering the existing power distribution and residential infrastructures. Additionally, there is a need for collaborative vehicle charging that does not compromise the comfort and privacy of the neighborhood residents.

SUMMARY OF THE INVENTION

The present invention addresses the needs described above by providing a method for the cooperative charging of electric vehicle batteries connected to a step-down transformer. The method comprises determining a summation of a plurality of residential power demands, wherein at least one of the residential power demands is a charging of an electric vehicle battery, the summation of the residential power demands is greater than an upper power limit of the transformer, and identities of individual residential power demands are concealed; at a beginning of a time slot, lessening the charging of at least one electric vehicle battery so that a recalculated summation of the residential power demands does not exceed the upper power limit of the transformer; charging the electric vehicle batteries according to the lessening for the duration of the time slot; and repeating the above for subsequent time slots until the upper power limit of the transformer is sufficient for simultaneous operation of all residential power demands.

The method may be performed wherein the lessening the charging results in either shedding the charging the charging of at least one electric vehicle battery or reducing an amperage supply to at least one electric vehicle battery.

The invention also includes a method for charging a plurality of electric vehicle batteries connected to a step-down transformer powering a plurality of residences, the method comprising identifying a plurality of residential power demands, wherein at least one of the residential power demands is a charging of an electric vehicle battery and a summation of the residential power demands is greater than an upper power limit of the transformer; identifying a time-critical subset of the residential power demands and a time-flexible subset of the residential power demands, wherein the time-flexible subset includes the charging of the electric vehicle batteries; allocating, at a beginning of a time slot, power from the transformer among all time-critical residential power demands and a portion of the time-flexible residential power demands so as not to exceed the upper power limit of the transformer for a duration of the time slot; charging the electric vehicle batteries according to the allocating for the duration of the time slot; and repeating the above for subsequent time slots until the upper power limit of the transformer is sufficient for simultaneous operation of all residential power demands.

The allocating the portion of the time-flexible residential power demands may involve reducing the amperage supply to at least one electric vehicle or shedding at least one time-flexible residential power demand. At least one of the time-flexible residential power demands may be the operation of an HVAC system.

The identification of residential power demands, identification of the time-flexible residential power demands and the time-critical residential power demands, and allocation of power may be performed by each of a plurality of local demand management clients that are synchronized at the beginning of each of the time slots. Allocation may be accomplished by voting by the local demand management clients.

Also, the identification of residential power demands, identification of the time-flexible residential power demands and the time-critical residential power demands, and allocation of power may be performed by a master local demand management client selected from a plurality of local demand management clients.

Additionally, one aspect of the invention is a method for charging a plurality of electric vehicle batteries each connected to a corresponding one of a plurality of charging stations at a residence. The method comprises identifying a plurality of residential power demands, wherein at least one of the residential power demands is a charging of an electric vehicle battery, and a summation of the residential power demands is greater than an upper power limit of the residence; identifying a time-critical subset of the residential power demands and a time-flexible subset of the residential power demands, wherein the time-flexible subset includes the charging of the electric vehicle batteries; allocating, at a beginning of a time slot, power to the residence among all time-critical residential power demands and a portion of the time-flexible residential power demands so as not to exceed the upper power limit of the residence for a duration of a time slot; charging the electric vehicle batteries according to the allocating for the duration of the time slot; and repeating the above for subsequent time slots until the upper power limit of the transformer is sufficient for simultaneous operation of all residential power demands.

As in the multi-residence collaborative scenario, the allocating the portion of the time-flexible residential power demands may involve reducing the amperage supply to at least one electric vehicle or shedding at least one time-flexible residential power demand. At least one of the time-flexible residential power demands may be the operation of an HVAC system.

At least one of the time-flexible residential power demands may be the operation of an HVAC system. Allocation of power may be such that the HVAC system is activated in every alternative time slot. The allocation of power may further comprise issuing a signal from a utility control center to the plurality of residences, wherein the signal is a utility-specific demand response signal or a pricing signal; receiving the signal at the plurality of residences; selecting an at least one preferred charging schedule at an at least one corresponding one of the plurality of residences based on the signal; communicating the at least one preferred charging schedule to the utility control center; and modifying the upper power limit according to the at least one preferred charging schedule.

Another embodiment of the invention is a system for charging a plurality of electric vehicle batteries each electrically connected to a corresponding one of a plurality of charging stations at a residence. The system comprises a local demand management client located at the residence, wherein the local demand management client is separate from the charging stations, capable of monitoring and controlling residential power demands, and in communication with a plurality of appliances at the corresponding residence and the plurality of charging stations.

The local demand management client may be in communication with a plurality of additional local demand management clients each associated with a plurality of additional residences electrically connected to a common step-down transformer.

The system may further comprise a mechanism for obtaining a summation of residential power demands on the transformer such that identities of individual residential power demands are concealed, wherein the mechanism is in communication with the local demand management clients.

DESCRIPTION OF THE INVENTION

A system and method enable collaborative negotiation between residences in order to allocate power from the neighborhood step-down transformer so as to maximize vehicle charging efficiency and user comfort. By decentralizing the collaborative mechanism and bringing it to the residential level rather than centralizing control at the transformer or any other platform (e.g. utility-specific control center), alterations to the existing electrical infrastructure are minimized. Furthermore, decentralization enhances system scalability, performance, reliability, and local decision-making capability.

Figure 1:
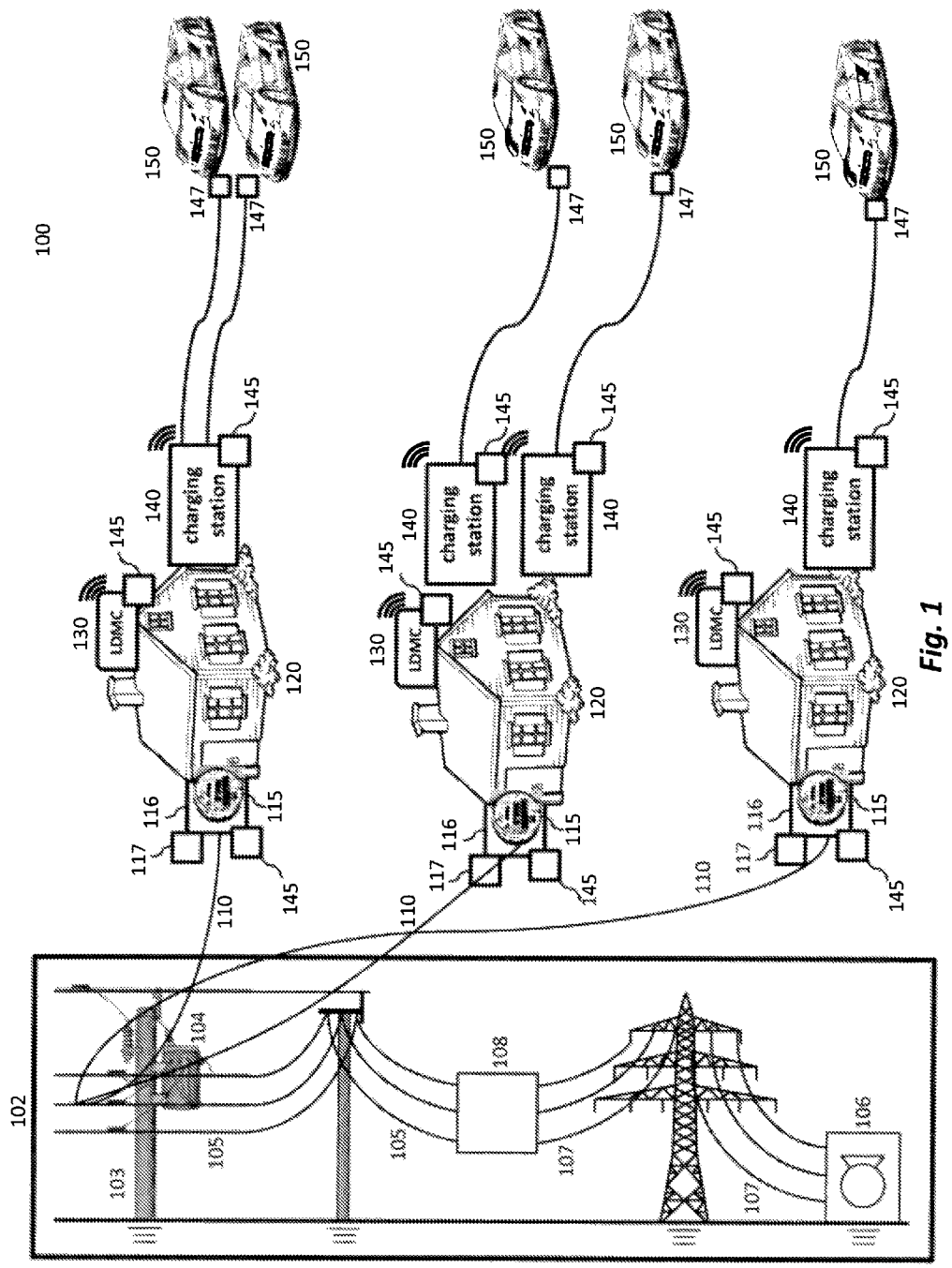
FIG. 1 is a schematic illustration of an exemplary collaborative charging system.

FIG. 1 illustrates a typical configuration of a collaborative charging system 100 according to an exemplary embodiment of the present invention. The system 100 is established such that minimal changes to the power grid 102 are required. The power grid 102 includes a power generation source 106 connected to a step-down transformer 104 via high voltage transmission 107 and distribution lines 105. The high voltage power is stepped down at a first step-down transformer 108 and again at the neighborhood transformer 104. The neighborhood step-down transformer is located along the distribution lines 105 on a distribution pole 103. In a residential neighborhood, multiple residences 120 may receive power via low voltage local distribution lines 110 connected to the neighborhood step-down transformer 104. The power is distributed along the local distribution lines 110 to meters 115 at the residences 120. The transformer 104 has an upper limit representing the maximum load that can be requested from these neighboring residences 120 altogether. Depending on load size and type, neighborhood transformers typically range in size from 25 kVA to 75 kVA per phase. A typical 25 kVA neighborhood transformer generally serves four to seven homes in a neighborhood. Excessive demand may overload the transformer and result in consequences such as reduced lifetime of the transformer or temporary outage.

A typical household can have different types of loads that vary in demand from a few watts (a 40 W light) to several kilowatts (a 5.5 kW HVAC system). In general, the total residential load usually ranges from 1.5 kW to 8 kW. Depending on several parameters—type of load, timing of use—some loads (also called demands) may be characterized as time-critical residential demands and some as time-flexible residential demands. In the context of this invention, time-critical demands may not be lessened (e.g. cooking loads before meal time); time-flexible demands may be lessened for a certain duration of time during their regular operation (e.g. shedding the HVAC system, dimming lights by reducing the amperage supply). A demand may be lessened either by shedding or by reducing the amperage supply available to satisfy that particular demand. A demand is shed when it is eliminated during a given time slot. It may either be cancelled or shifted, which involves the reassignment of the power demand to a different time slot. A user will not significantly notice shedding of a time-flexible demand for a short duration of time to allow vehicle charging and the subsequent activation of that load for the next time slot. Similarly, a user will not notice a reduction in amperage supply to a time-flexible demand for a short duration of time. The lessening of demands may be performed within a single residence or between residences in a collaborative manner.

Since a single vehicle charge demand can be as great as 7.2 kW, a circuit breaker connected to the house or the neighborhood step-down transformer may not permit power distribution sufficient for simultaneous satisfaction of all residential demands. The scenario becomes even more complex when all the neighboring houses request electricity to charge their vehicles at the same time. Even though the electric vehicle users typically prefer to charge their vehicle batteries during global off-peak hours (nighttime), local demand peaks and the capacity of the neighborhood step-down transformer may prevent charging of all the requesting vehicles of the neighboring houses at the same time. To solve this problem, a collaborative energy management strategy is presented herein to facilitate the charging of all the vehicles. The present invention is not limited by the standard for maximum current set forth by the Society of Automotive Engineers.

Figure 2:
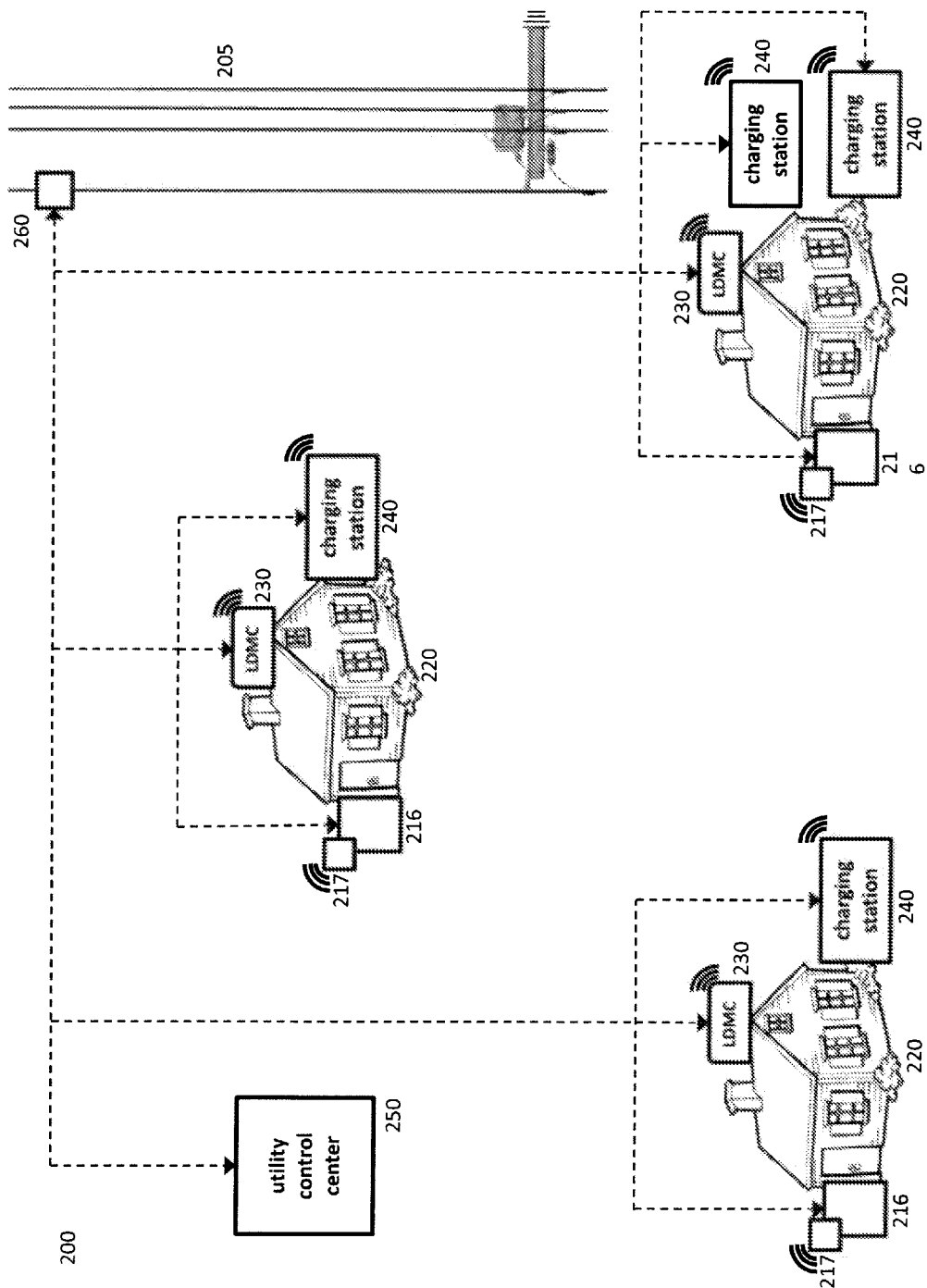
FIG. 2 is a schematic of an exemplary network of communication between residences.

In a preferred embodiment of the system illustrated in FIG. 1, multiple electric vehicles 150 are connected to corresponding charging stations 140 located at the residences 120. Local demand management clients 130 are separate from the charging stations 140 and are located at the residences 120; they are in communication with the load control communication centers 117 and charging stations 140. The charging stations 140, local demand management clients 130, and load control communication centers 117 preferably include wireless routers 145 for wireless communication. The charging stations 140, local demand management clients 130, and load control communication centers 117 may also be adapted for wired communication via a local area network, Internet, or power line communication. Wireless communication options may include WiFi, ZigBee, and cellular communications. Communication between the system components is illustrated in FIG. 2. The load control communication center 217, local demand management client 230, and charging stations 240 for each residence 220 are in communication with each other. Additionally, local demand management clients 230 for each residence 220 can communicate with local demand management clients 230 at other residences 220 in the neighborhood.

Figure 3:
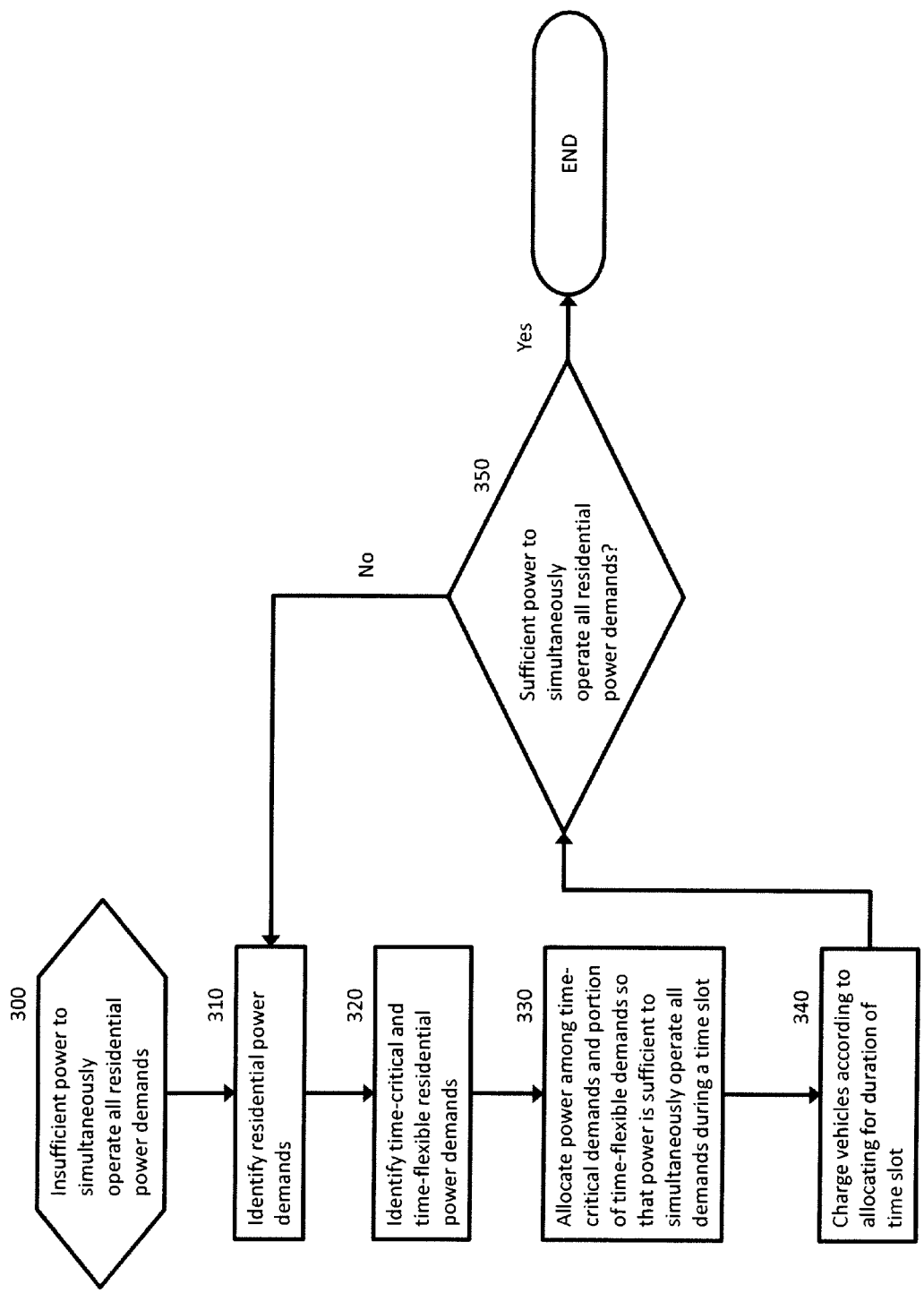
FIG. 3 is a flow chart demonstrating a method of collaborative charging of electric vehicles.

FIG. 3 illustrates a collaborative methodology in accordance with the present invention. The flow chart depicts an algorithm for allocating power from the neighborhood transformer 104 over a series of iterative time slots until all vehicles 150 have been successfully charged. Examples of time slot durations include 5 minutes, 30 minutes, and 2 hours. The time slot should be long enough to minimize power distribution control issues while remaining short enough to enable practical shedding of power demands. The time slot may be fixed or variable in duration. The process initiates when there is insufficient power for the simultaneous operation of all residential power demands 300. For each time slot, the residential power demands are identified 310 and classified 320 as either time-critical or time-flexible. Time-flexible demands include vehicle charging demands, HVAC loads, and any other load that can be lessened by shedding or reducing amperage supply. Power is allocated among the time-critical residential power demands and a portion of the time-flexible residential power demands 330 so that the power available from the transformer is adequate for the simultaneous operation of the remaining demands for the duration of that time slot. For example, allocation of power may be accomplished by reducing the amperage supplied at the charging stations or by shedding a time-flexible residential power demand for the duration of the time slot. Variable amperage output can be accomplished with configurable charging stations. The vehicles are then charged and other power demands are satisfied according to the allocating for the duration of the time slot 340.

At the end of the time slot, a determination is reached 350 concerning the power available. If, at the end of the time slot, it is determined that there is sufficient power to simultaneously operate all residential power demands, the analysis concludes and all demands are satisfied. If the available power remains insufficient, the process reinitiates by identifying 310 the residential power demands.

A pseudocode representation of an exemplary methodology for a single residence scenario is as follows:

---
Definitions:
---

$P_1$: Available power from the particular residence at a certain time slot
$HVAC_{power}$: Power required by the HVAC system at this time slot
CS: Maximum kW of power a single charging station is capable of providing
$SHL_{e\text{-}car}$: List of vehicles requesting to be charged from the same residence
1: while (true)
2:  if ($P_1 \geq \Sum_{i=0}^{n} CS_i$) then
3:    Charge all the n e-cars together from $SHL_{e\text{-}car}$
4:  else if ($P_1 < \Sum_{i=0}^{n} CS_i + HVAC_{power}$) then
5:    if HVAC was selected in the previous time slot then
6:      Select the currently chosen e-car e ∈ $SHL_{e\text{-}car}$ using a pure round-robin inside $SHL_{e\text{-}car}$
7:      Shed or reduce amperage supply to non-selected e-cars
8:    else select HVAC system
9:   end if
10: else
11:   Try to find other loads that may be lessened to facilitate e-car charging
12: end while The above pseudocode representation provides an exemplary illustration for a single residence scenario. If the available power from a particular residence is sufficient to provide the maximum power output at each charging station at the residence while maintaining HVAC operation, then all vehicles are charged simultaneously. If not, then the operation of HVAC is shed in alternating time slots to maximize vehicle charging without shedding HVAC operation for consecutive time slots. During the time slots in which HVAC is in operation, the charging of one or more vehicles is lessened either by shedding or reducing its amperage supply. The selection of vehicles is determined by a round-robin schedule, which rotates between all vehicles in a pre-determined fashion, sequentially charging each vehicle before reinitiating the cycle. A round-robin schedule prevents starvation of any one vehicle, which would involve the perpetual denial of power to that vehicle's charging station. If the shedding of HVAC is insufficient to enable simultaneous charging of all vehicles at the residence, then other time-flexible demands may be lessened.

There is no limitation on the number of vehicles and charging stations at each residence; there may be a plurality of vehicles charging at a single residence either at separate charging stations or at a single charging station. The charging station has the capability of controlling power output to each vehicle individually. Other demands in addition to HVAC that can be shed include lighting, washing, and charging of consumer electronics. This invention considers any time-flexible demand that can be lessened during a time slot without being significantly noticed by the user. This ensures the users' comfort throughout the collaborative charging. Additionally, vehicles may be charged at varying charging rates in order to accommodate a greater number of residential demands. For example, a charging station may have a configurable amperage output, which would allow for variation in the power required to charge a vehicle battery.

A pseudocode representation of an exemplary methodology for a multiple residence scenario is as follows:

---
Definitions:

$P_{sum}$: Summation of available power from the neighboring houses at this time slot
$P_{new}$: Summation of available power from the neighboring houses calculated after shedding some HVAC systems
$L_{e\text{-}car}$: List of all e-cars requesting to be charged at this time slot
CS: Maximum kW of power a single charging station can provide to an e-car
$HVAC_{power}$: Power required by the HVAC system
1: while (true)
2.  if ($P_{sum} \geq \Sigma_{i=0}^{n} CS_i$) then
3:      Select all the n e-cars together from $L_{e\text{-}car}$
4:  else if ($P_{sum} < \Sigma_{i=0}^{n} CS_i$) and HVAC system is not in operation then
5:      Determine how many e-cars k may be charged with full amperage supply at the same time where
        $P_{sum} = \Sigma_{i=0}^{k} CS_i$
6:      Select current k number of e-cars from $L_{e\text{-}car}$ where round-robin policy is applied
7:      Shed or reduce amperage supply to non-selected e-cars
8:      Update the list pointer in $L_{e\text{-}car}$
9:  else if ($P_{sum} < \Sigma_{i=0}^{n} CS_i + \Sigma_{i=0}^{n} HVAC_{power}^i$) then
10:     Determine how many e-cars k may be charged with full amperage supply at the same time where
        $P_{sum} = \Sigma_{i=0}^{k} CS_i + \Sigma_{i=0}^{n} HVAC_{power}^i$
11:     if k ≠ 0 then
12:         Select current k number of e-cars from $L_{e\text{-}car}$ where round-robin policy is applied
            Shed or reduce amperage supply to non-selected e-cars
13:         Update the list pointer in $L_{e\text{-}car}$
14:     else
15:         Select list of HVACs x that were not shed in the previous time slot to be shed in this time slot
16:         Determine new $P_{new}$ after shedding x number of HVAC systems
17:         Determine how many e-cars k may be charged with full amperage supply at the same time
            where $P_{new} = \Sigma_{i=0}^{k} CS_i + \Sigma_{i=0}^{x} HVAC_{power}^i$
18:         Select current k number of e-cars from $L_{e\text{-}car}$ where round-robin policy is applied
            Shed or reduce amperage supply to non-selected e-cars
19:         Update the list pointer in $L_{e\text{-}car}$
20:     end if
21:     Charge the selected cars from the list $L_{e\text{-}car}$ and cars assigned a low amperage power supply
22: end while

---

The above pseudocode representation provides an exemplary illustration for a multiple residence scenario. If the power available to the residences is sufficient to provide the maximum power output at each charging station while maintaining HVAC operation, then all vehicles are charged simultaneously. If not, then a round-robin schedule is implemented to charge the maximum number of vehicles while maintaining HVAC operation. If no vehicles can be charged while maintaining HVAC operation, then the operation of HVAC at the residences is shed in alternating time slots to maximize vehicle charging without shedding HVAC operation at any given residence for consecutive time slots. The power available is recalculated and the maximum number of vehicles is charged according to a round-robin schedule. If the shedding of HVAC is insufficient to enable simultaneous charging of all vehicles at the residence, then other time-flexible loads may be lessened by shedding or reducing the amperage supply.

This loop will be reiterated for every pre-defined time slot. For the sake of simplicity, the pseudocode suggests that the HVAC demands are similar for each residence. However, the present invention can allocate power from the transformer among residential power demands even when the HVAC demands vary for each residence.

The present invention supports multiple mechanisms for the identification of residential power demands, identification of the time-flexible residential power demands and the time-critical residential power demands, and allocation of power. The methodology may be performed by each local demand management client or by a single local demand management client. For example, each local demand management client may independently perform the disclosed methodology, and a voting process between the local demand management clients may be used to determine which allocated schedule will be applied. An alternate methodology supported by the invention involves the selection of a master local demand management client from the plurality of local demand management clients. The master local demand management client receives information from the other local demand management clients concerning the current residential demands at each residence and performs the identification of residential power demands, identification of the time-flexible residential power demands and the time-critical residential power demands, and allocation of power. The master local demand management client then communicates the allocated schedule to the remaining plurality of local demand management clients, and the vehicle batteries are charged according to the allocation. An algorithm determines which local demand management client is the master in any given time slot, and the status as the master local demand management client may change from time slot to time slot. For example, a round-robin policy may be adopted to rotate master status among the local demand management clients.

Figure 5:
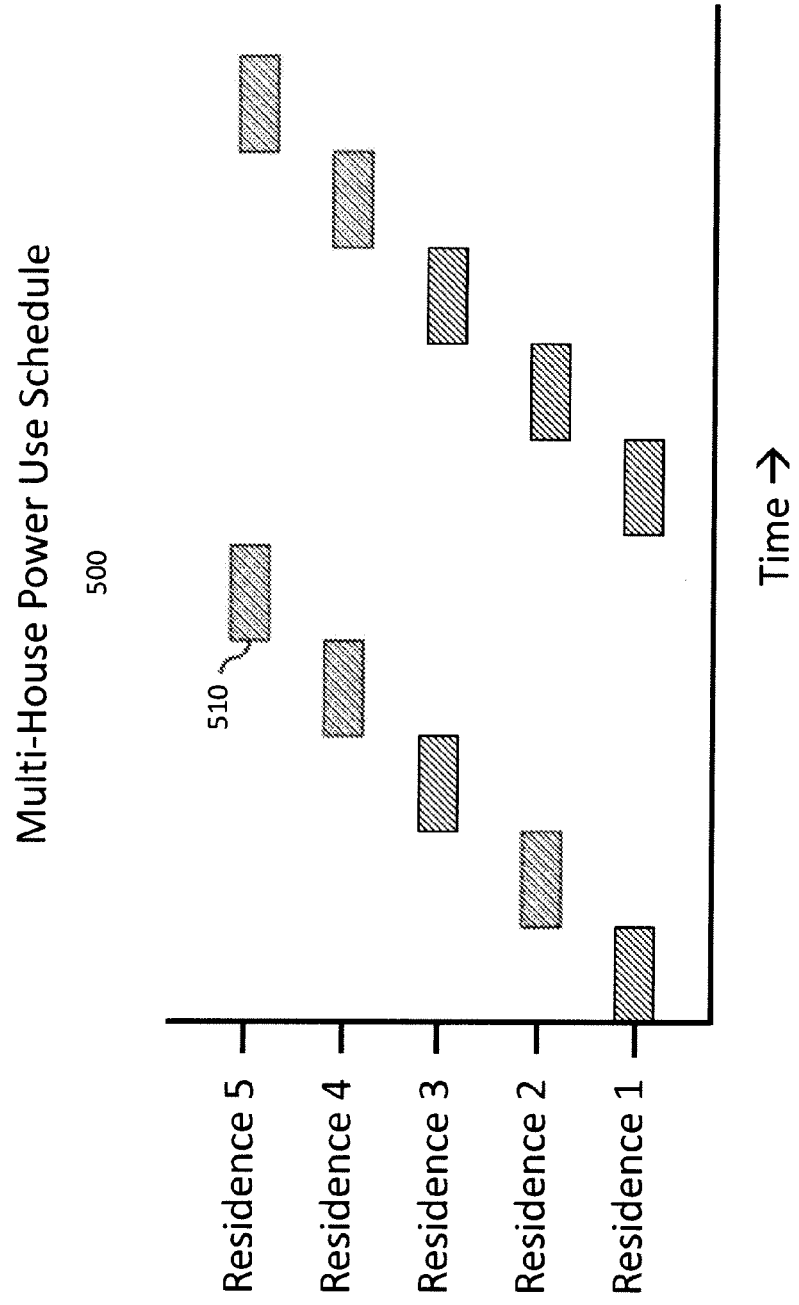
FIGS. 5-8 are timelines illustrating a variety of potential charging sequences.
Figure 6:
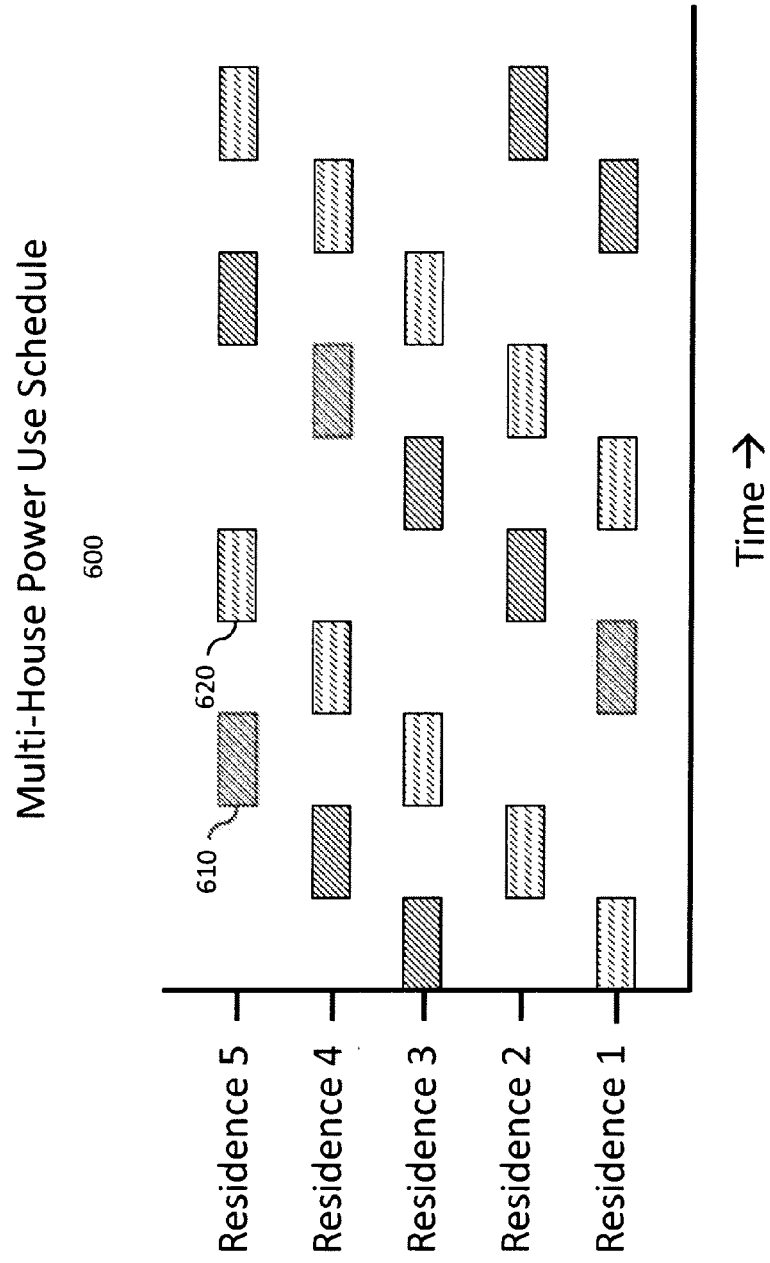
Figure 7:
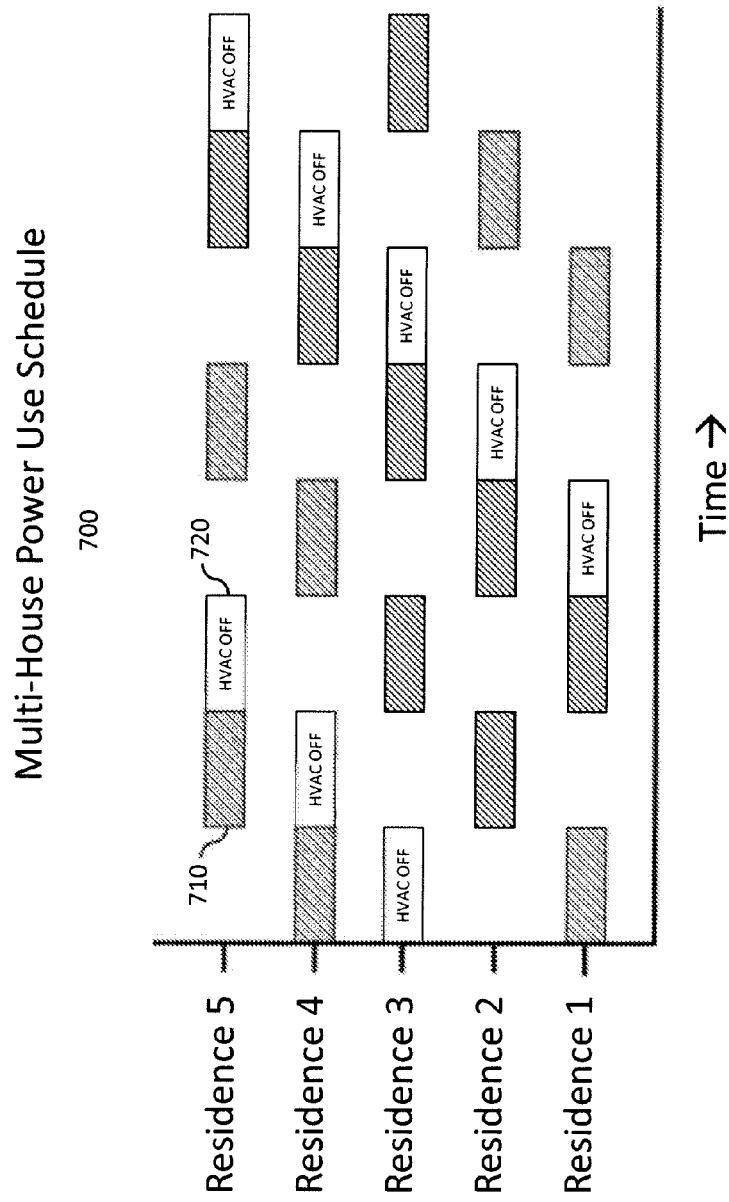
Figure 7A:
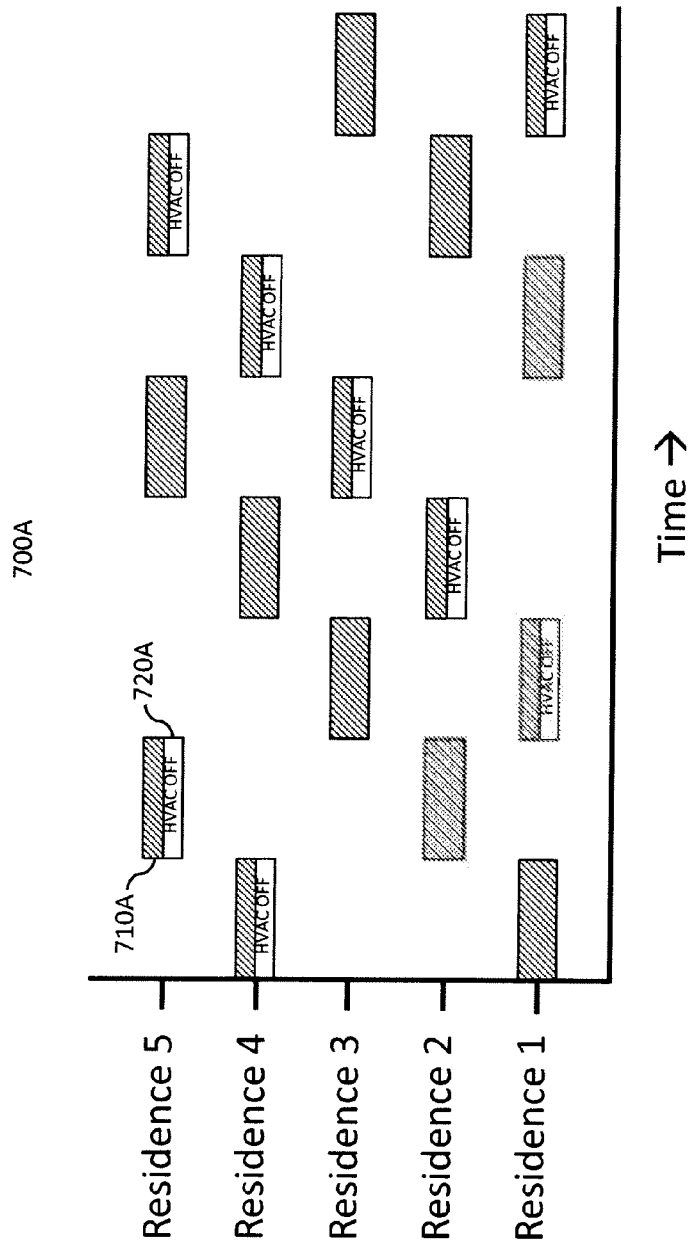

FIGS. 5-7 depict example power allocation schedules for multiple residences. In FIG. 5, a simple round-robin schedule 500 is implemented where each residence charges a vehicle in turn. A shaded bar 510 represents that a vehicle is being charged at an indicated residence. The pattern continues until all vehicles are completely charged. This example schedule illustrates a scenario where the transformer is capable of providing power sufficient for charging only one vehicle at a time at full amperage supply without shedding or shifting other residential power demands. Each residence has only one vehicle requiring charging, and each vehicle charges once every five time slots. FIG. 6 illustrates a variation of this schedule 600 where two residences can simultaneously charge vehicles, where vehicle charging is again represented by a shaded bar 610 for a full amperage supply or by a partially shaded bar 620 for a reduced amperage supply. Any pattern of time assignment may be implemented as long as no charging station is consistently starved of power. Vehicle charging is the only time-flexible load considered in this illustration. Each vehicle is charged for two out of five time slots, and multiple vehicles may be charged simultaneously. FIG. 7 demonstrates a power allocation schedule 700 where each residence takes a turn deactivating its HVAC system so that vehicles at other residences may charge. In both FIG. 7 and FIG. 7A, each vehicle charges in two out of every five time slots. In FIG. 7A, a residence will only shed HVAC if it is simultaneously charging a vehicle. However, the present invention does not require that a residence's HVAC operation is shed in the same time slot in which a vehicle is charging at that residence. Additional HVAC systems may be deactivated in order to maximize the number of vehicles charging at any given time. Additionally, other time-flexible loads may be lessened by shedding or reducing the amperage supply during a time slot. A load may be lessened at the same residence where a vehicle is being charged during the same time slot.

Figure 8:
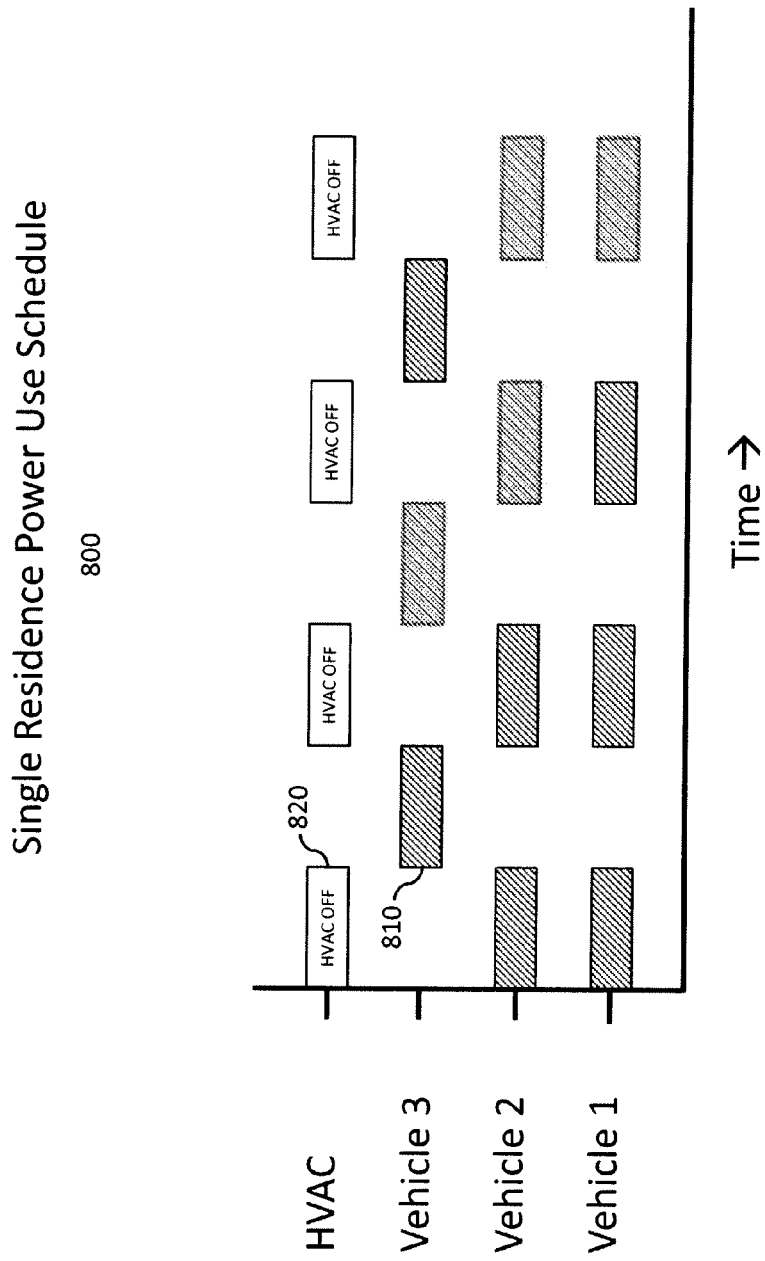

FIG. 8 depicts a power allocation schedule 800 for a single residence with multiple vehicles. In this example, the residence has enough power to charge only one vehicle at a time without lessening a time-flexible demand. The HVAC system is deactivated during alternating time slots in order to maximize the number of vehicles charging simultaneously. HVAC operation is never shed for consecutive time slots.

Although the illustrations depict a pure round-robin schedule, the present invention is by no means limited to this charging pattern. A weighted round-robin algorithm may also be implemented based on load characterizations, priority measures, and other social factors, (e.g. emergency situations). A local priority may be achieved if some vehicle users agree to pay an increased price rate for electricity and the other vehicle users agree to the negotiation. If the negotiation occurs locally, results of the negotiation will be reported to the utility control center and meter rates will be adjusted. The utility control center will then bill the residences based on the negotiated rate. Furthermore, vehicle users may communicate charging requests based on utility-specific demand response signals or pricing signals received by each residence. This communication initiates a negotiation between the utility provider and a residence and operates separately from the collaboration between residences. The utility provider may issue a demand response signal, which is an explicit request to reduce energy consumption, or will issue a pricing signal imposing a price increase, providing an incentive to reduce energy consumption. Thus, negotiations may occur vertically between the utility control center and vehicle users based on demand response signals or pricing signals, or horizontally between multiple vehicle users willing to adjust pricing rates to assign priority of power supply. This information is then provided to the utility control center. Referring to FIG. 2, each residence 220 requesting charging may directly communicate with the utility control center 250 and modify its charging request. The utility control center manages the residences' use of electricity and relays pricing and supply information between the residence and the power supplier. The utility control center communicates with residences independently of the power grid. Based on these communications, the utility control center 250 may issue a modified signal of power availability in the requesting neighborhood. The negotiation may also occur collaboratively among the residences 220 connected to a common step-down transformer.

The collaborative methodology can be performed while considering the comfort of the users. The algorithm can be optimized so that no residence is deprived of HVAC for consecutive iterations. Thus, depending on the particular demands at a residence, the HVAC system may be shed only in a particular iteration and not in consecutive iterations. Also, it is possible to shed additional HVAC systems in other residences in order to maximize the number of vehicles charging at any given time. Furthermore, the system operates without starving any particular charging station of energy by shedding or reducing the amperage supply to the charging station for many consecutive time slots. By categorizing residential demands as either time-critical or time-flexible and considering the comfort of the users, the invention enables the efficient collaborative charging of electric vehicles with minimal disruption to user routine.

A preferred embodiment of the system separates the local demand management client 230 from the charging station 240. The negotiation algorithm is highly complex, capable of learning and forecasting energy demand patterns. By separating the charging station 240 from the local demand management client 230, greater computation complexity can be achieved without compromising the performance of the algorithm or the charging station 240. Rather than locating the local demand management client 230 at the charging station 240, the local demand management client 230 may be contained in a gateway control device such as a gateway router or any other computing device used for home automation that has knowledge about the residential demands. This arrangement avoids the need for large computational power at the charging station 240 by limiting charging station 240 performance to simple tasks while the local demand management client 230 runs the negotiation algorithm. The arrangement also avoids unnecessarily sending information from the load control communication center 217 within the household to the charging stations 240, which results in inefficiency. Instead, the gateway control device already has access to this data, and the algorithm can be executed without the transfer of information. The execution of the non-real time negotiation algorithm is decoupled from execution of the charging station's 240 real-time charging loop. Alternatively, the negotiation algorithms may be executed at the charging station 240 if the charging stations 240 have sufficient computing power and storage capability.

The implementation of the collaborative energy management system requires only a minimum cost of upgrading the existing electrical and residential infrastructures. The management system operates via communication both at the intra-house level as well as at the inter-house level within the neighborhood. The collaborative energy management methodology does not depend on the architecture of the communication infrastructure; thus, the present invention is capable of operating with any communication medium. All types of communication involved in the present invention can be both wired or wireless. In addition, power line communication (PLC) is also a possibility. Additional examples of communication networks include local area networks and Internet.

FIG. 2 depicts a possible communication network 200 supported by the present invention. Although communication within the network 200 is depicted as wireless, wired communication is also supported by the invention. Within a single house, the controlled appliances (e.g. HVAC systems) communicate locally with the local demand management client 230 via a load control communication center 217. The local demand management client 230 communicates with the charging stations 240 at that residence and any additional local demand management clients 230 within the network 200. State-of-the-art actuators may be connected to the appliances in order to facilitate the collaborative energy management. For example, a Zigbee thermostat may be used to control HVAC operation.

Various options exist for inter-house communication and include, but are not limited to: (1) a local area network infrastructure among the local demand management clients, and (2) Internet communication between local demand management clients using their specified IP.

Figure 4:
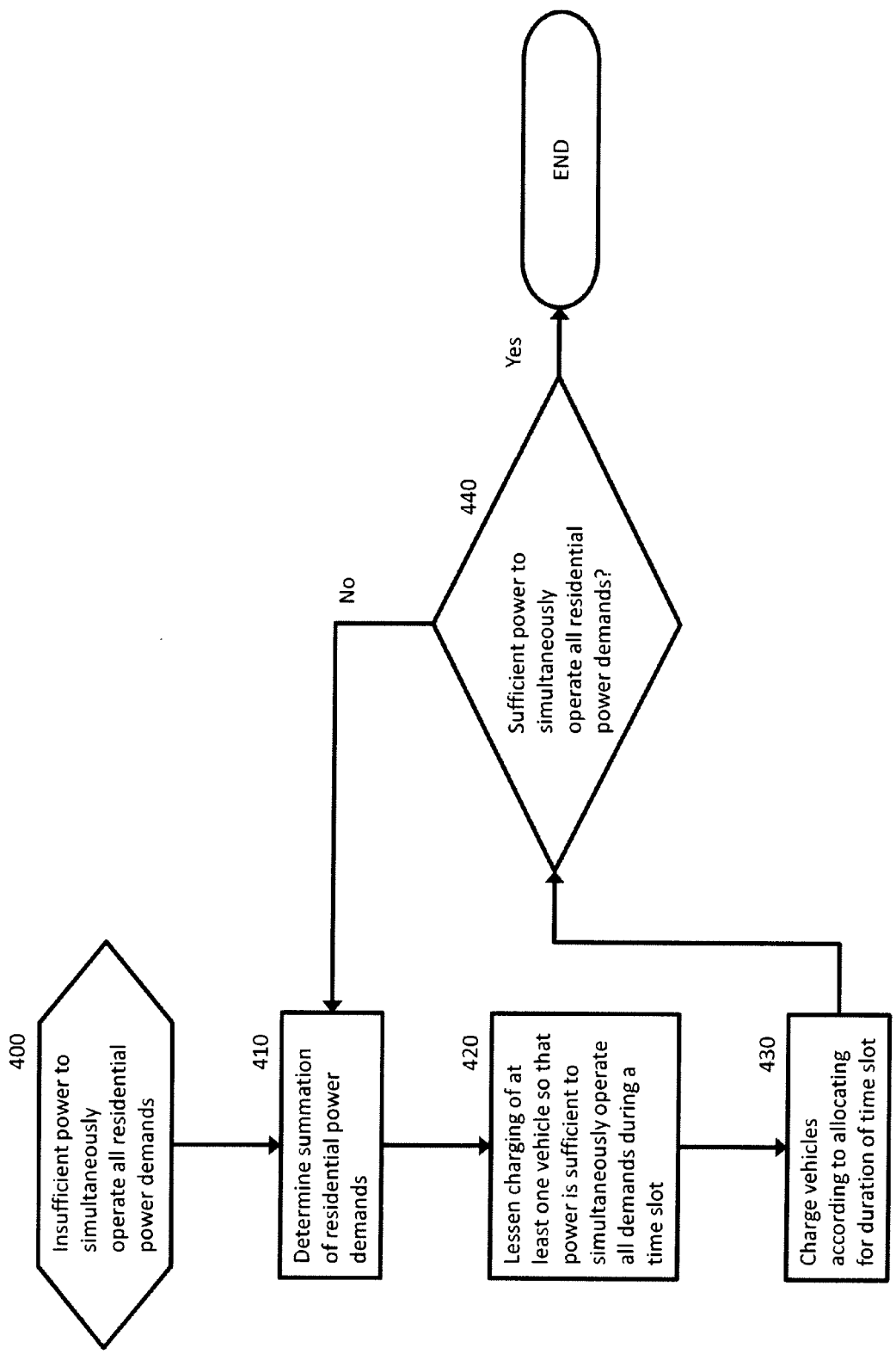
FIG. 4 is a flow chart demonstrating a method of collaborative charging where privacy issues are a concern.

Privacy and security concerns may be considered in the application of inter-house communication. Some neighbors may not be comfortable sharing specific information concerning household energy consumption (e.g. monthly electricity expenses, total meter reading, current electricity usage, etc.). For example, this information can be utilized by others to determine when a neighbor is away from home. To protect user privacy, a pure round-robin vehicle charging policy may be adopted among the neighboring residences connected to a common transformer. The identification of the residences connected to the transformer may be provided by the utility company. FIG. 4 depicts a flow chart for an exemplary application of the collaborative methodology that takes privacy and security concerns into consideration. Individual residential power demands are not revealed to users. Instead, a summation of residential power demands is determined 410, and the charging of at least one vehicle battery is lessened 420, either by shedding or reducing its amperage supply, for a time slot. The vehicles are then charged 430 according to the lessening 420, and the process repeats until it is determined 440 that there is sufficient power to simultaneously satisfy all residential power demands. Referring to FIG. 2, the summation of available power from the neighborhood level transformer at a certain time slot may be determined by communication between a mechanism located at a utility control center 250 or a plurality of sensors on the distribution lines 260. Internet may be utilized for communication between the local demand management client and the utility company. According to this methodology, neighbors will not learn of an individual residence's energy consumption. Therefore, a vacant residence and a residence not requiring vehicle charging will be treated in a similar fashion, hiding user specific information and providing privacy.

Cyber security may also be addressed, as all the local demand management clients may be connected to the Internet. A special software layer may provide cyber security in the collaborative energy management algorithm. Encryption and user authentication may be used to provide cyber security during communication among residences, charging stations, and the utility control center. Other cyber security measures may also be taken and are within the scope of the invention.

The elements of the methodology as described above may be implemented in a computer system comprising a single unit or a plurality of units linked by a network or a bus.

The computer may be a portable handheld device or a desktop or laptop computer or any other device that includes a display. The computer receives data from any number of data sources that may be connected to the computer, including a wide area data network that may be connected to the computer via a connection.

The computer includes a central processing unit (CPU) and a memory. The computer may be connected to an input device and an output device. The input may be a mouse, network interface, touch screen, etc., and the output may be a liquid crystal display (LCD), cathode ray tube (CRT) display, printer, etc. The computer may be connected to a network, with all commands, input/output and data being passed via the network. The computer can be configured to operate and display information by using, e.g., the input and output devices to execute certain tasks.

The CPU includes one or more passive network monitoring modules that are configured for performing one or more methods for monitoring a network as discussed herein.

The memory includes a random access memory (RAM) and a read-only memory (ROM). The memory may also include removable media such as a disk drive, tape drive, memory card, etc., or a combination thereof. The RAM functions as a data memory that stores data used during execution of programs in the CPU and is used as a work area. The ROM functions as a program memory for storing a program executed in the CPU. The program may reside on the ROM or on any other tangible or non-volatile computer-usable medium as computer readable instructions stored thereon for execution by the CPU or another processor to perform the methods of the invention. The ROM may also contain data for use by other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for charging a plurality of electric vehicle batteries connected to a step-down transformer powering a plurality of residences, the method comprising:
   identifying a plurality of residential power demands, wherein:
   at least one of the residential power demands is a charging of an electric vehicle battery, and
   a summation of the residential power demands is greater than an upper power limit of the transformer;
   identifying a time-critical subset of the residential power demands and a time-flexible subset of the residential power demands, wherein the time-flexible subset includes the charging of the electric vehicle batteries;
   allocating, at a beginning of a time slot, power from the transformer among all time-critical residential power demands and a portion of the time-flexible residential power demands so as not to exceed the upper power limit of the transformer for a duration of the time slot;

charging the electric vehicle batteries according to the allocating for the duration of the time slot; and repeating the above for subsequent time slots until the upper power limit of the transformer is sufficient for simultaneous operation of all residential power demands;

wherein schedules allocating the power from the transformer are independently computed by each of a plurality of local demand management clients for each of the plurality of residences, and further wherein a voting process among the local demand management clients is used to decide which of the schedules is used in the allocating, at a beginning of a time slot, of power from the transformer.

2. A method as in claim 1, wherein the allocating the portion of the time-flexible residential power demands comprises lowering an amperage supply to at least one electric vehicle battery.

3. A method as in claim 1, wherein the allocating the portion of the time-flexible residential power demands comprises shedding at least one time-flexible residential power demand from the residential power demands.

4. A method as in claim 1, wherein no residence is deprived of power for consecutive time slots.

5. A method as in claim 1, wherein at least one of the time-flexible residential power demands is operation of an HVAC system.

6. A method as in claim 1, wherein the allocating prioritizes a shedding of the charging of the electric vehicle batteries over a shedding of the remaining time-flexible residential power demands.

7. A method as in claim 1, wherein the allocating maximizes a number of the electric vehicle batteries being charged simultaneously.

8. A method as in claim 1, wherein the allocating minimizes demand peaks to the transformer.

9. A method as in claim 1, wherein no electric vehicle battery is starved by the allocating.

10. A method as in claim 1, wherein the identifying the residential power demands, the identifying the time-flexible residential power demands and the time-critical residential power demands, and the allocating power are performed by each of the plurality of local demand management clients, the local demand management clients synchronized at the beginning of each of the time slots.

11. A method as in claim 1, wherein the identifying the residential power demands, the identifying the time-flexible residential power demands and the time-critical residential power demands, and the allocating power are performed by a master local demand management client, the master local demand management client selected from a plurality of local demand management clients.

12. A method as in claim 1, wherein the allocating further comprises:

issuing a signal from a utility control center to the plurality of residences, wherein the signal is a utility-specific demand response signal or a pricing signal;

receiving the signal at the plurality of residences;

selecting an at least one preferred charging schedule at an at least one corresponding one of the plurality of residences based on the signal;

communicating the at least one preferred charging schedule to the utility control center; and modifying the upper power limit according to the at least one preferred charging schedule.

* * * * *